United States Patent [19]
Kawamura

[11] Patent Number: 5,386,321
[45] Date of Patent: Jan. 31, 1995

[54] ZOOM LENS
[75] Inventor: Kazuteru Kawamura, Tokyo, Japan
[73] Assignee: Olympus Optical Co., Ltd., Tokyo, Japan
[21] Appl. No.: 964,258
[22] Filed: Oct. 21, 1992
[30] Foreign Application Priority Data Oct. 22, 1991 [JP] Japan ................... 3-273985

[51] Int. Cl.$^6$ ..................... G02B 15/14; G02B 13/18
[52] U.S. Cl. ..................... 359/692; 359/714; 359/715
[58] Field of Search ................... 359/692, 714, 715

[56] References Cited
U.S. PATENT DOCUMENTS 4,991,945  2/1991  Estelle ............... 359/692 X
5,162,947  11/1992 Ito ..................... 359/692
5,218,478  6/1993  Itoh .................... 359/692

FOREIGN PATENT DOCUMENTS 2181110  7/1990  Japan .
3127008  5/1991  Japan .
3158814  7/1991  Japan .

Primary Examiner—Scott J. Sugarman
Attorney, Agent, or Firm—Cushman, Darby & Cushman

[57] ABSTRACT

The invention provides a zoom lens which comprises a first lens group G1 of positive refracting power and a second lens group G2 of negative refracting power, said first lens group comprising, in order from the object side, a first lens $L_1$ formed of plastics having not substantially refracting power, a second lens $L_2$ of negative refracting power and a third lens $L_3$ of positive refracting power. This zoom lens, albeit using a plastic lens, is less likely to undergo a variation in the focal position due to temperature and humidity changes, inexpensive, compact and of good performance.

40 Claims, 11 Drawing Sheets

ZOOM LENS

BACKGROUND OF THE INVENTION

The present invention relates to a zoom lens system and, more particularly, to a compact and high-performance, two-group type of zoom lens system making use of a plastic lens, which is best fit for use on a lens shutter camera having a zoom ratio of about 2.

For achieving an inexpensive and compact zoom lens, it is of course effective to reduce the number of lenses used. Reducing the number of lens groups used should be preferable as well, because this makes it possible to simplify the construction of the lens frame, reduce performance degradation due to eccentric displacements of the groups and attain stable performance at low costs. In such a context, reducing the number of lenses used in a two-group type of zoom lens system is effective for achieving a compact and inexpensive zoom lens.

Even in the case of a zoom lens for a compact camera having a zoom ratio of 2 or thereabout, however, it is imperatively required to use an aspherical surface for gaining good-enough performance, if five or fewer lenses are used to this end.

One typical example of the prior art aiming at making a zoom lens compact by reducing the number of lenses used is set forth in Japanese Provisional Patent Publication No. 3-127008. However, the example of this publication teaches the use of an aspherical glass surface. Of course, the use of a glass lens places some limitation on cutting down the price of a zoom lens; to put it another way, the use of a plastic lens is inevitable for reducing that price further. For instance, this is typically disclosed in Japanese Provisional Patent Publication No. 2-181110.

When a plastic lens is employed, however, attention should be paid to large changes in its refractive index and lens configuration due to temperature and humidity changes. The above-mentioned publication states that any focal position displacement occurring by temperature changes can be set off by the use of positive and negative lenses. This procedure may be effective only in the context that the refractive index changes due to temperature changes are stabilized within a relatively short span of time. However, it is indeed impossible to neglect surface configuration changes which are affected by how lenses are held by the lens frame, and so it is very difficult to predict focal position displacements, if occurs.

When there are humidity changes, however, much time is needed for stabilizing lenses' refractive indices and configurations. If the power of a single plastic lens is strong, as in the above-mentioned example of the prior art, the focal position will indeed be subject to some large displacement in the course of humidity absorption, although depending on to what degree each lens absorbs humidity. In addition, when varying plastic materials are used at the same time, as in the above-mentioned example, even larger focal position displacements will occur due to the fact that the degree of humidity absorption differs from time to time.

SUMMARY OF THE INVENTION

In view of such problems as mentioned above, an object of the invention is to provide a compact, inexpensive and high-performance zoom lens system making use of a plastic lens, in which variations in the focal position displacement due to temperature and humidity changes are reduced considerably and, more particularly, a zoom lens system that is chiefly suited for use on a lens shutter camera having a zoom ratio of 2 or thereabout.

A zoom lens system of the invention designed for attaining the object mentioned above includes, in order from the object side, a first lens formed of a plastic lens in a powerless lens form, a second lens of negative power and a third lens of positive power, and comprises a first lens unit or group having positive power as a whole and a second lens group having a negative power.

Another zoom lens system of the invention includes, in order from the object side, a first lens formed of a plastic lens with the convex surface turning in the same direction so as to be made powerless, a second lens of negative power and a third lens of positive power, and comprises a first lens group having a positive power as a whole and a second lens group having negative power.

In each of the two aspects of the invention, the first lens may be a meniscus lens convex on the object side, a meniscus lens that is convex on the object side and includes an aspherical surface on at least one surface or a meniscus lens that is convex on the object side, includes an aspherical surface on at least one surface and conforms to the following condition (1):

$$-5 < f_T^2/(f_1 \cdot F) < 5 \tag{1}$$

where
$f_T$ is the focal length of the total system at the telephoto end,
$f_1$ is the focal length of the first lens, and
$F$ is the F-number at the telephoto end.

More preferably, the following condition (2) should be met:

$$-3 < f_T^2/(f_1 \cdot F) < 3 \tag{2}$$

The second lens group mentioned above may include a positive meniscus lens convex on the image side and a negative lens or at least one plastic lens, and conforms to the following conditions as well:

$$-3.5 < (f_T^2 - f_W^2)/(f_1 F) < 2.5 \tag{3}$$

$$-4 < f_T^2/(f_1 F) + f_4(\beta_{2T} - \beta_R)^2/F < 4 \tag{4}$$

where
$f_T$ is the focal length of the total system at the telephoto end,
$f_W$ is the focal length of the total system at the wide angle end,
$f_1$ is the focal length of the first lens,
$f_4$ is the focal length of the plastic lens in the second lens group,
$F$ is the F-number at the telephoto end,
$\beta_{2T}$ is the magnification of the second lens unit at the telephoto end, and
$\beta_R$ is the magnification of an optical system located in the rear of said plastic lens.

More preferably, the following conditions (5) and (6) are met:

$$-2 < (f_T^2 - f_W^2)/(f_1 \cdot F) < 1.5 \tag{5}$$

$$-2.5 < f_T^2/(f_1 \cdot F) + f_4(\beta_{2T} - \beta_R)^2/F < 2.5 \quad (6)$$

In addition, the following condition (7) should preferably be satisfied:

$$f_4(\beta_{2T} - \beta_R)^2/F < 3.5 \quad (7)$$

For zooming, it is preferred that the first and second lens groups move toward the object side from the wide angle to telephoto end. It is then preferred that the first and second lens groups move toward each other during zooming; that is, the spacing between them is narrowing during zooming.

In the ensuing description, reference will be made to why and how the construction of the invention is adopted and acts.

If a plastic lens is used, it is possible to obtain a lens system at low costs, as already mentioned. However, the plastic lens is so large in terms of the refractive index and configuration changes due to temperature and humidity changes that there can be a large variation in the focal position.

As already stated, it is also indeed difficult to set off the focal position variation by means of positive and negative plastic lenses.

In order to reduce or limit the focal position variation, there is need of making the plastic lens used as close to a powerless lens as possible and reducing an adverse influence of the single plastic lens's changes in the refractive index and configuration upon a variation in the focal position of the total system.

For the reasons mentioned just above, the lens system of the invention comprises a first positive lens group G1 and a second negative lens group G2, and the first lens group G1 is constructed from, in order from the object side, a substantially powerless, plastic and aspherical meniscus lens $L_1$ that is convex on the object side, a negative lens $L_2$ and a positive lens $L_3$.

Such a lens arrangement enables the lenses $L_2$ and $L_3$ to bring the principal point of the first lens group G1 close to the image side, while on-axial aberration and chromatic aberration of magnification are well corrected by the negative and positive lenses, so that the lens system can achieve compactness with a well-enough zoom ratio. Since the meniscus lens convex on the object side including an aspherical surface is used as the lens $L_1$, spherical aberration and coma induced mainly through the lenses $L_2$ and $L_3$ can be well corrected regardless of the fact that the lens $L_1$ is nearly powerless. Now let $f_1$, $f_T$ and F denote the focal length of the lens $L_1$, the focal length of the total system at the telephoto end and the F-number at the telephoto end. It is then desired that $$-5 < f_T^2/(f_1 \cdot F) < 5 \quad (1)$$

so as to reduce the focal position variation of the total system due to temperature and humidity changes.

Referring now to the recent trend of compact cameras, they are mainly taking the form of cameras capable of making panoramic prints. To add to this, pseudo telephotography is envisaged, which is designed to use a part of film plane at the time of shooting and make a print of ordinary size at the time of printing.

With such cameras in which the magnification of enlargement becomes high at the time of printing, some difficulty is involved in obtaining clear photographs, unless the accuracy of focusing is higher than usual.

In addition, even higher accuracy is demanded not only for using a part of film and making prints on an ordinary enlarged scale but for making enlarged prints as well.

In order to obtain even higher accuracy, it is desired that the following condition (2) be satisfied in addition to the condition (1):

$$-3 < f_T^2/(f_1 \cdot F) < 3 \quad (2)$$

In terms of correcting the curvature of the field and distortion, it is also desired that the second lens group G2 be constructed from a positive meniscus lens $L_4$ convex on the image side and a negative lens $L_5$.

Such a lens arrangement enables the plastic lens to be effectively used for making the zoom lens system compact, improving its performance and stabilizing its focal position with respect to temperature and humidity changes; that is, it is possible to achieve a compact, inexpensive and high-performance zoom lens system.

A zoom lens system of even higher performance is achievable at even lower costs by constructing the first lens group G1 from a substantially powerless, aspherical plastic lens $L_1$, a negative lens $L_2$ and a positive lens $L_3$ and the second lens group G2 from a positive, aspherical and plastic lens $L_4$ and a negative lens $L_5$, as shown in FIG. 3.

However, it is here noted that the use of the plastic lens in the second lens group G2 again gives rise to a focal position variation due to temperature and humidity changes.

For this reason, it is required that the focal lengths $f_1$ and $f_4$ of the lenses $L_1$ and $L_4$ conform to the following conditions (3) and (4):

$$-3.5 < (f_T^2 - f_W^2)/(f_1 F) < 2.5 \quad (3)$$

$$-4 < f_T^2/(f_1 F) + f_4(\beta_{2T} - \beta_R)_2/F < 4 \quad (4)$$

where $f_W$ is the focal length of the total system at the wide angle end, $\beta_{2T}$ is the magnification of the second lens group G2 at the telephoto end, and $\beta_R$ is the magnification of an optical system (the lens $L_5$ in FIG. 3) in the rear of the lens $L_4$ at the telephoto end.

The condition (3) is provided to limit a difference in the focal position displacement from the wide angle to telephoto conditions, which occurs through the lens $L_1$ due to temperature and humidity changes. Above and below the upper and lower limits, the positive or negative power of the lens $L_1$ becomes too strong to obtain stable performance, because there is a large focal position displacement.

The condition (4) is provided to limit the focal position displacements of the lenses $L_1$ and $L_4$ that occurs due to temperature and humidity changes. If the conditions (3) and (4) are satisfied at the same time, it is then possible to achieve a zoom lens system that is less subject to focal position displacement due to temperature and humidity changes regardless of using plastic lenses in the first and second lens groups G1 and G2.

When higher accuracy is needed for panoramic photography or enlargement, as is the case with the condition (2), it is desired to meet the following conditions (5) and (6):

$$-2 < (f_T{}^2 - f_W{}^2)/(f_1 \cdot F) < 1.5 \quad (5)$$

$$-2.5 < f_T{}^2/(f_1 \cdot F) + f_4(\beta_{2T} - \beta_R)^2/F < 2.5 \quad (6)$$

In this case, it is further desired to meet the following condition (7):

$$f_4(\beta_{2T} - \beta_R)^2/F < 3.5 \quad (7)$$

The condition (7) is provided to limit some focal position displacement that occurs through the lens $L_4$ due to temperature and humidity changes. In order to further reduce the focal position displacement of the total system from the wide angle to telephoto conditions, it is desired to meet this condition (7) in addition the conditions (3) and (4) or (5) and (6).

Still other objects and advantages of the invention will be in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
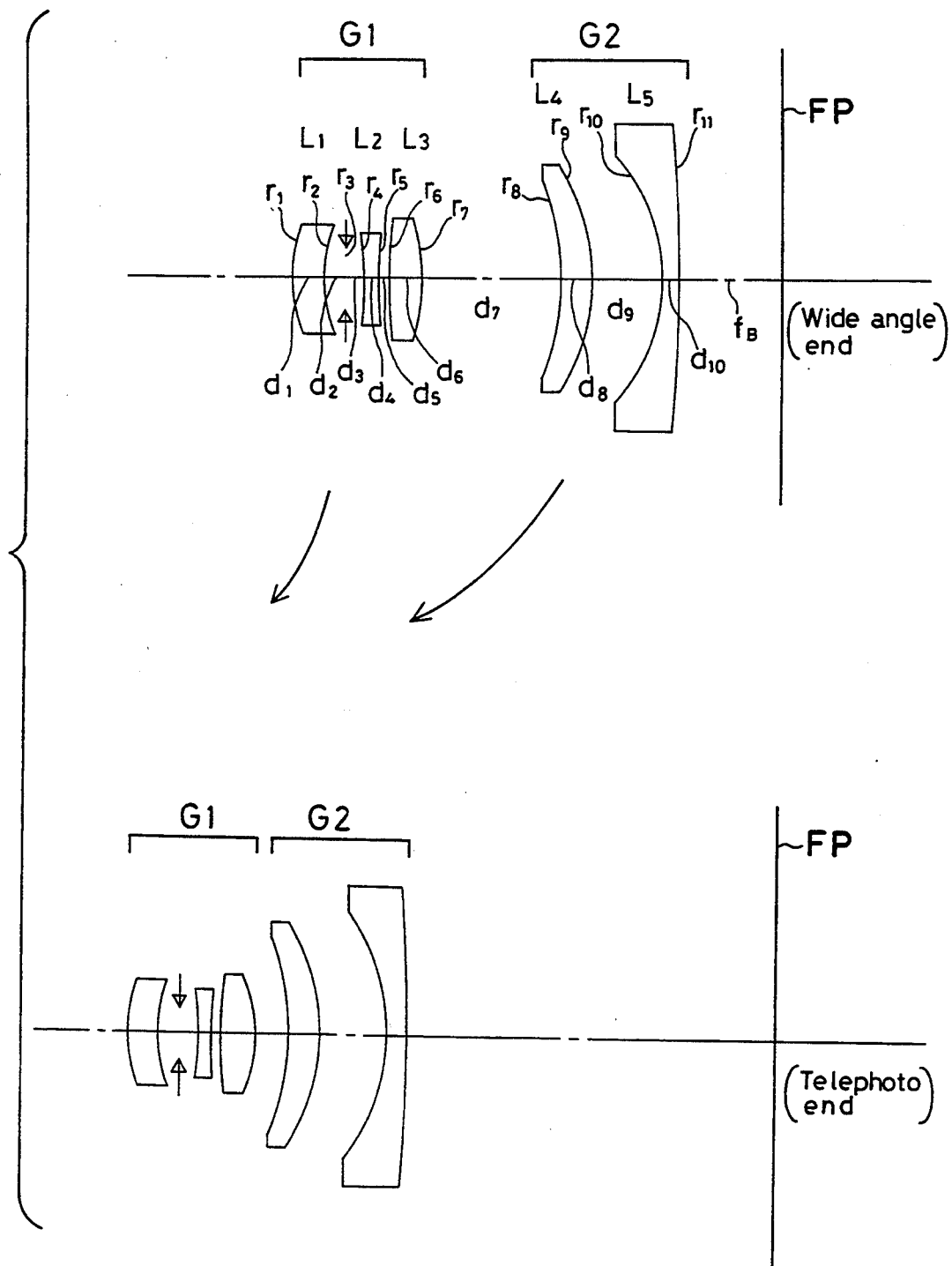
FIG. 1 represents a lens arrangement in section of Example 1 of the zoom lens system including a powerless lens according to the invention at the wide angle and telephoto ends.
Figure 2:
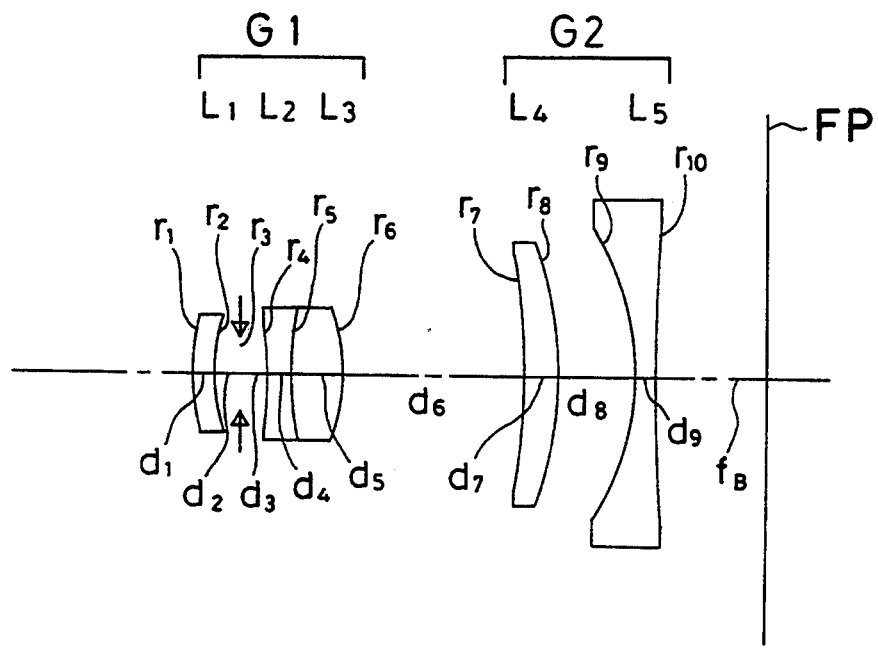
FIG. 2 is a sectional view of Example 2 at the wide angle end.
Figure 3:
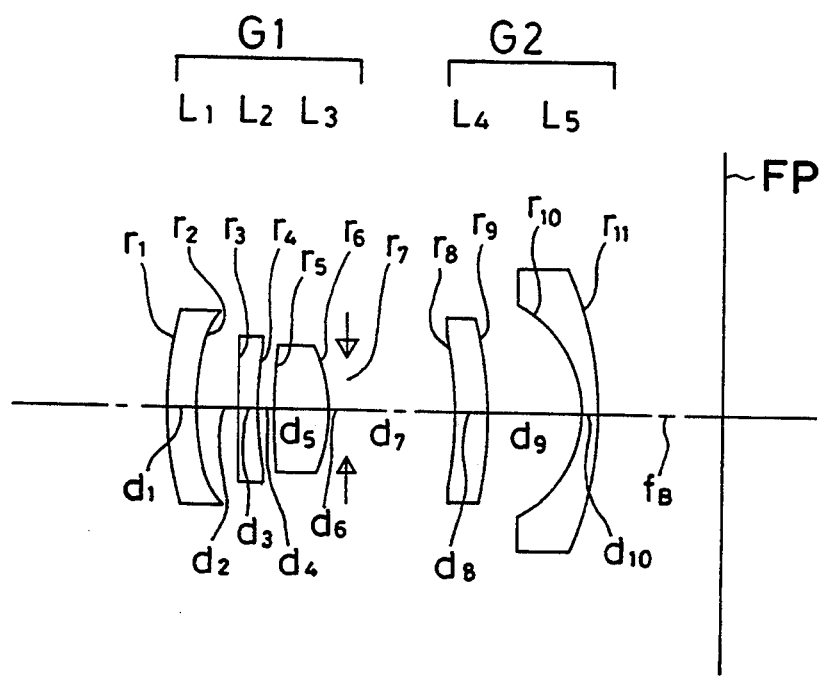
FIG. 3 is a sectional view of Example 3 at the wide angle end.
Figure 4:
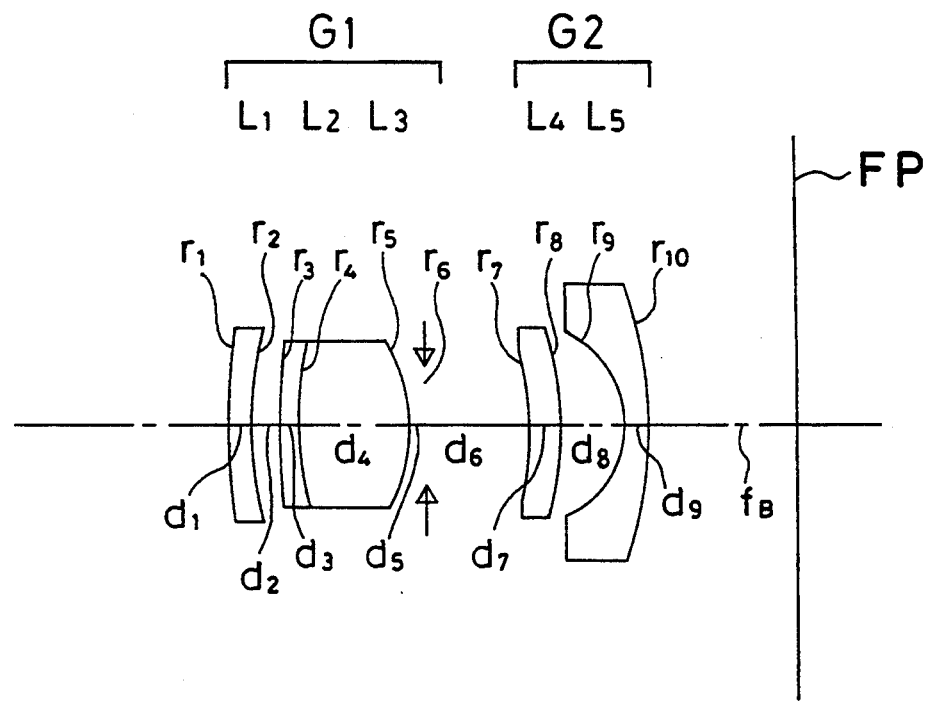
FIG. 4 is a sectional view of Example 4 at the wide angle end.
Figure 5:
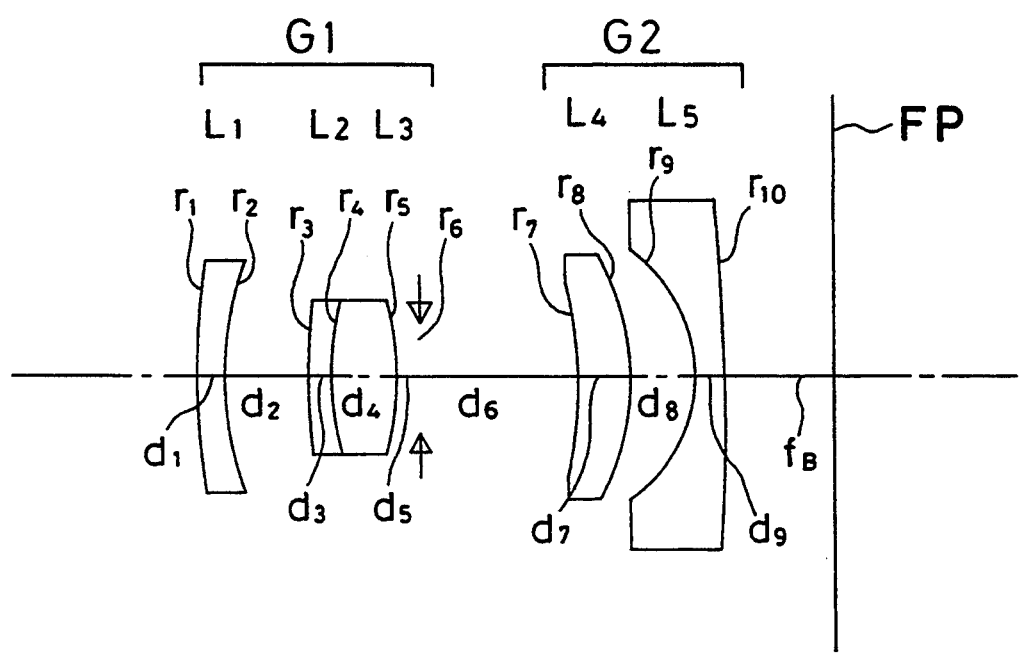
FIG. 5 is a sectional view of Example 5 at the wide angle end.
Figure 6:
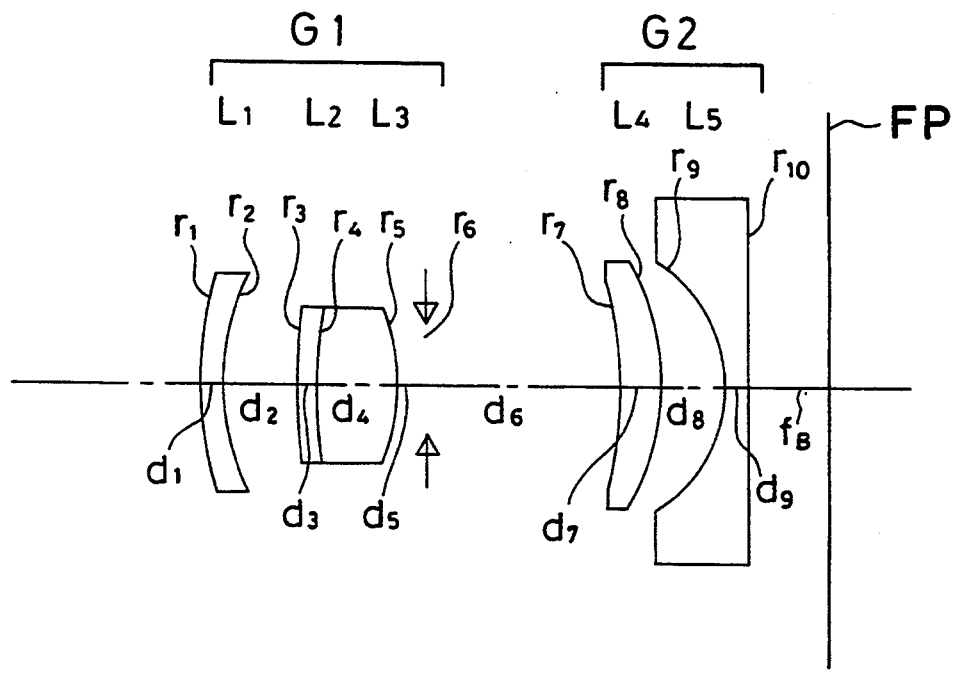
FIG. 6 is a sectional view of Example 6 at the wide angle end.
Figure 7:
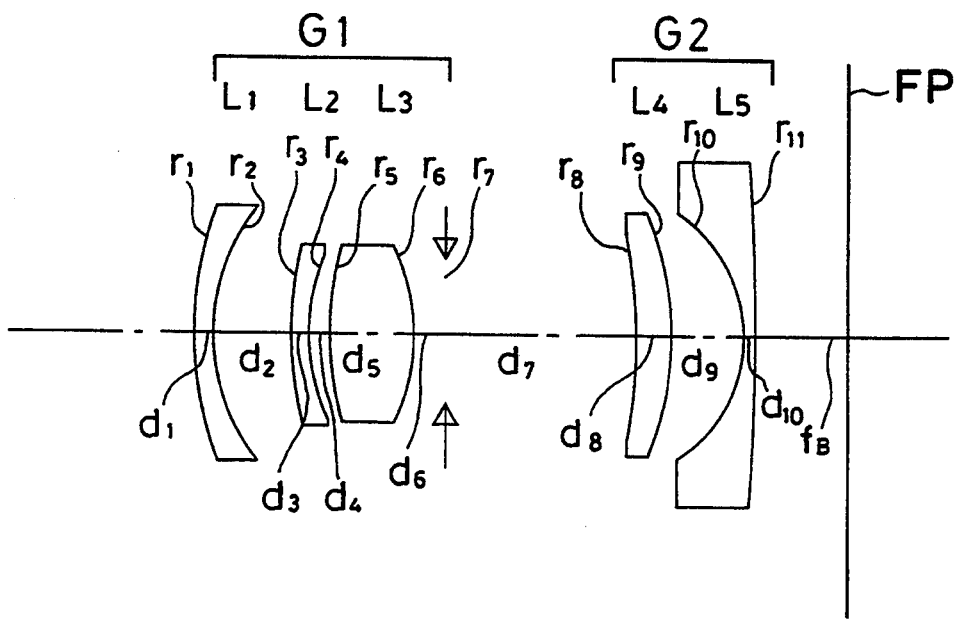
FIG. 7 is a sectional view of Example 7 at the wide angle end.

In what follows, the invention will now be explained with reference to Examples 1-7. The lens data of each example will be given later, and the lens arrangement of Example 1 at the wide angle and telephoto ends is shown in section in FIG. 1 while the lens arrangements of Examples 2-7 at the wide angles are shown in section in FIGS. 2-7. Throughout the drawings, FP stands for a focal plane.

Examples 1-7 are each directed to a two-group zoom lens system comprising the first and second lens groups G1 and G2. In the zoom lens system of Example 1, the first and second lens groups G1 and G2 move toward the object side from the wide angle to telephoto conditions while the space $d_7$ between them is narrowing for zooming.

The first lens group G1 comprises, in order from the object side, a plastic lens $L_1$ of weak power with the rear surface defined by an aspherical surface, a negative lens $L_2$ and a positive lens $L_3$, said lens $L_1$ being a meniscus lens convex on the object side. The second lens group G2 comprises, in order from the object side, a positive lens $L_4$ and a negative lens $L_5$.

In the zoom lens system of Example 2, the first and second lens groups G1 and G2 move toward the object side from the wide angle to telephoto conditions while the space $d_6$ between them is narrowing for zooming.

The first lens group G1 comprises, in order from the object side, a plastic lens $L_1$ of weak power with the rear surface defined by an aspherical surface, a negative lens $L_2$ and a positive lens $L_3$, said lens $L_1$ being a meniscus lens convex on the object side. The negative and positive lenses $L_2$ and $L_3$ are so cemented together that the degradation of the performance of the zoom lens system by their eccentric displacements can be reduced while the chromatic aberration is well corrected. The second lens group G2 comprises, in order from the object side, a positive lens $L_4$ and a negative lens $L_5$.

In the zoom lens system of Example 3, the first and second lens groups G1 and G2 move toward the object side from the wide angle to telephoto conditions while the space $d_7$ between them is narrowing for zooming.

The first lens group G1 comprises, in order from the object side, a plastic lens $L_1$ of weak power with the rear surface defined by an aspherical surface, a negative lens $L_2$ and a positive lens $L_3$, said lens $L_1$ being a meniscus lens convex on the object side. The second lens group G2 comprises a plastic lens $L_4$ and a negative lens $L_5$, the rear surface of said plastic lens $L_4$ being defined by an aspherical surface.

In the zoom lens system of Example 4 or 5, the first and second lens groups G1 and G2 move toward the object side from the wide angle to telephoto conditions while the space $d_6$ between them is narrowing for zooming.

The first lens group G1 comprises, in order from the object side, a plastic lens $L_1$ of weak power with the rear surface defined by an aspherical surface, a negative lens $L_2$ and a positive lens $L_3$, said lens $L_1$ being a meniscus lens convex on the object side. The negative and positive lenses $L_2$ and $L_3$ are so cemented together that the degradation of the performance of the zoom lens system by their eccentric displacements can be reduced while the chromatic aberration is well corrected. The second lens group G2 comprises a plastic lens $L_4$ and a negative lens $L_5$, both surfaces of said plastic lens $L_4$ being defined by aspherical surfaces.

In the zoom lens system of Example 6, the first and second lens groups G1 and G2 move toward the object side from the wide angle to telephoto conditions while the space $d_7$ between them is narrowing for zooming.

The first lens group G1 comprises, in order from the object side, a plastic lens $L_1$ of weak power with the rear surface defined by an aspherical surface, a negative lens $L_2$ and a positive lens $L_3$, said lens $L_1$ being a meniscus lens convex on the object side. The negative and positive lenses $L_2$ and $L_3$ are cemented together. The second lens group G2 comprises a plastic lens $L_4$ and a negative lens $L_5$, both surfaces of said plastic lens $L_4$ being defined by aspherical surfaces.

In the zoom lens system of Example 7, the first and second lens groups G1 and G2 move toward the object side from the wide angle to telephoto conditions while the space $d_7$ between them is narrowing for zooming.

The first lens group G1 comprises, in order from the object side, a plastic lens $L_1$ of weak power with the rear surface defined by an aspherical surface, a negative lens $L_2$ and a positive lens $L_3$, said lens $L_1$ being a meniscus lens convex on the object side. The second lens group G2 comprises a plastic lens $L_4$ and a negative lens $L_5$, both surfaces of said plastic lens $L_4$ being defined by aspherical surfaces.

It is noted that in all the examples PMMA (polymethyl methacrylate) is used as plastics.

In the lens data of Examples 1–7, symbols used but not used hereinbefore having the following means: f is the focal length of the total system, $F_{NO}$ is the F-number, $2\omega$ is the field angle, $r_1, r_2 \ldots$ are the radii of curvature of the lens surfaces, $d_1, d_2 \ldots$ are the spaces between the lens surfaces, $n_{d1}, n_{d2} \ldots$ the d-line refractive indices of the lenses and $v_1, v_2 \ldots$ are the Abbe's number of the lenses. The aspherical configuration applied, when x and r stand for the axial direction and the direction normal thereto, respectively, is represented by $$x=(y^2/r)/[1+\{1-P(y^2/r^2)\}^{\frac{1}{2}}]+A_4y^4+A_6y^6+A_8y^8+A_{10}y^{10}$$

where
r is the paraxial radii of curvature,
P is the conical coefficient, and
$A_4$, $A_6$, $A_8$ and $A_{10}$ are the aspherical coefficients.

EXAMPLE 1

| | | | |
|---|---|---|---|
| | $f = 39.0 \sim 47.6 \sim 58.1$ | | |
| | $F_{NO} = 5.4 \sim 6.6 \sim 8.0$ | | |
| | $2\omega = 57.9° \sim 48.8° \sim 40.8°$ | | |
| $r_1 = 13.8017$ | $d_1 = 3.000$ | $n_{d1} = 1.49216$ | $v_{d1} = 57.50$ |
| $r_2 = 13.6639$ (Aspheric) | $d_2 = 2.000$ | | |
| $r_3 = \infty$ (Stop) | $d_3 = 1.800$ | | |
| $r_4 = -28.0821$ | $d_4 = 1.499$ | $n_{d2} = 1.68893$ | $v_{d2} = 31.08$ |
| $r_5 = 133.4203$ | $d_5 = 0.869$ | | |
| $r_6 = 52.4470$ | $d_6 = 3.499$ | $n_{d3} = 1.65160$ | $v_{d3} = 58.52$ |
| $r_7 = -14.0091$ | $d_7 =$ (Variable) | | |
| $r_8 = -23.6740$ | $d_8 = 2.998$ | $n_{d4} = 1.53256$ | $v_{d4} = 45.91$ |
| $r_9 = -19.0810$ | $d_9 = 6.820$ | | |
| $r_{10} = -16.7960$ | $d_{10} = 1.600$ | $n_{d5} = 1.60729$ | $v_{d5} = 59.38$ |
| $r_{11} = -140.7120$ | | | |

| Zooming Spaces | | | |
|---|---|---|---|
| f | 39.0 | 47.6 | 58.1 |
| $d_7$ | 13.2998 | 7.6375 | 3.0022 |

Aspherical Coefficients
Second surface $P = 7.3423$
$A_4 = -0.18567 \times 10^{-3}$
$A_6 = -0.34568 \times 10^{-5}$
$A_8 = -0.42417 \times 10^{-6}$
$A_{10} = 0.22258 \times 10^{-8}$

EXAMPLE 2

| | | | |
|---|---|---|---|
| | $f = 39.1 \sim 47.7 \sim 58.2$ | | |
| | $F_{NO} = 5.4 \sim 6.6 \sim 8.0$ | | |
| | $2\omega = 57.8° \sim 48.7° \sim 40.7°$ | | |
| $r_1 = 16.4290$ | $d_1 = 2.000$ | $n_{d1} = 1.49216$ | $v_{d1} = 57.50$ |
| $r_2 = 18.4496$ (Aspheric) | $d_2 = 2.200$ | | |
| $r_3 = \infty$ (Stop) | $d_3 = 2.000$ | | |
| $r_4 = -26.7392$ | $d_4 = 2.137$ | $n_{d2} = 1.62096$ | $v_{d2} = 35.88$ |
| $r_5 = 33.3053$ | $d_5 = 4.645$ | $n_{d3} = 1.69680$ | $v_{d3} = 56.49$ |
| $r_6 = -15.3801$ | $d_6 =$ (Variable) | | |
| $r_7 = -58.4901$ | $d_7 = 3.000$ | $n_{d4} = 1.53256$ | $v_{d4} = 45.91$ |
| $r_8 = -30.7889$ | $d_8 = 6.584$ | | |
| $r_9 = -21.4510$ | $d_9 = 1.640$ | $n_{d5} = 1.62041$ | $v_{d5} = 60.06$ |
| $r_{10} = 366.8262$ | | | |

| Zooming Spaces | | | |
|---|---|---|---|
| f | 39.1 | 47.7 | 58.2 |
| $d_6$ | 15.1667 | 7.9333 | 2.0013 |

Aspherical Coefficients
Second surface $P = 7.2977$
$A_4 = -0.37658 \times 10^{-4}$
$A_6 = 0.40754 \times 10^{-6}$
$A_8 = -0.12031 \times 10^{-6}$
$A_{10} = 0.32719 \times 10^{-8}$

EXAMPLE 3

| | | | |
|---|---|---|---|
| | $f = 39.1 \sim 47.7 \sim 58.2$ | | |
| | $F_{NO} = 5.4 \sim 6.6 \sim 8.0$ | | |
| | $2\omega = 57.8° \sim 48.7° \sim 40.7$ | | |
| $r_1 = 37.5030$ | $d_1 = 2.070$ | $n_{d1} = 1.49216$ | $v_{d1} = 57.50$ |
| $r_2 = 39.2314$ (Aspheric) | $d_2 = 3.732$ | | |
| $r_3 = 938.2603$ | $d_3 = 1.700$ | $n_{d2} = 1.74077$ | $v_{d2} = 27.79$ |
| $r_4 = 37.9237$ | $d_4 = 1.157$ | | |
| $r_5 = 49.3242$ | $d_5 = 5.000$ | $n_{d3} = 1.55232$ | $v_{d3} = 63.75$ |
| $r_6 = -13.2806$ | $d_6 = 1.000$ | | |
| $r_7 = \infty$ (Stop) | $d_7 =$ (Variable) | | |
| $r_8 = -36.0739$ | $d_8 = 3.299$ | $n_{d4} = 1.49216$ | $v_{d4} = 57.50$ |
| $r_9 = -33.9627$ (Aspheric) | $d_9 = 7.880$ | | |
| $r_{10} = -9.7157$ | $d_{10} = 1.640$ | $n_{d5} = 1.48749$ | $v_{d5} = 70.20$ |
| $r_{11} = -31.4655$ | | | |

| Zooming Spaces | | | |
|---|---|---|---|
| f | 39.1 | 47.7 | 58.2 |
| $d_7$ | 10.0045 | 6.1596 | 3.0057 |

Aspherical Coefficients
Second surface $P = 7.0007$
$A_4 = 0.10760 \times 10^{-3}$
$A_6 = 0.12652 \times 10^{-5}$
$A_8 = -0.14009 \times 10^{-7}$
$A_{10} = 0.52497 \times 10^{-9}$ 9th surface $P = 0.7323$
$A_4 = -0.66357 \times 10^{-4}$
$A_6 = 0.22125 \times 10^{-7}$
$A_8 = -0.15111 \times 10^{-7}$
$A_{10} = 0.81772 \times 10^{-10}$

EXAMPLE 4

| | | | |
|---|---|---|---|
| | $f = 39.1 \sim 47.7 \sim 58.2$ | | |
| | $F_{NO} = 4.8 \sim 5.8 \sim 7.1$ | | |
| | $2\omega = 57.8° \sim 48.7° \sim 40.7°$ | | |
| $r_1 = 54.7616$ | $d_1 = 2.000$ | $n_{d1} = 1.49216$ | $v_{d1} = 57.50$ |

-continued

| | | | |
|---|---|---|---|
| $r_2 =$ 52.9242 (Aspheric) | $d_2 =$ 1.999 | | |
| $r_3 =$ 72.9627 | $d_3 =$ 1.600 | $n_{d2} = 1.59270$ | $\nu_{d2} = 35.29$ |
| $r_4 =$ 17.5841 | $d_4 =$ 9.104 | $n_{d3} = 1.48749$ | $\nu_{d3} = 70.20$ |
| $r_5 =$ −12.4690 | $d_5 =$ 0.800 | | |
| $r_6 = \infty$ (Stop) | $d_6 =$ (Variable) | | |
| $r_7 =$ −30.5323 (Aspheric) | $d_7 =$ 3.085 | $n_{d4} = 1.49216$ | $\nu_{d4} = 57.50$ |
| $r_8 =$ −24.0804 (Aspheric) | $d_8 =$ 4.922 | | |
| $r_9 =$ −8.0710 | $d_9 =$ 1.886 | $n_{d5} = 1.48749$ | $\nu_{d5} = 70.20$ |
| $r_{10} =$ −32.6435 | | | |

Zooming Spaces

| f | 39.1 | 47.7 | 58.2 |
|---|---|---|---|
| $d_6$ | 8.4864 | 5.5804 | 3.2000 |

Aspherical Coefficients

Second surface
$P = -0.2414$
$A_4 = 0.13474 \times 10^{-3}$
$A_6 = 0.59240 \times 10^{-6}$
$A_8 = 0.75852 \times 10^{-9}$
$A_{10} = 0.31983 \times 10^{-9}$ 7th surface
$P = 1.0000$
$A_4 = 0.80691 \times 10^{-4}$
$A_6 = 0.74704 \times 10^{-7}$
$A_8 = 0.13882 \times 10^{-7}$
$A_{10} = 0$ 8th surface
$P = -1.1257$
$A_4 = -0.66285 \times 10^{-4}$
$A_6 = 0.65601 \times 10^{-6}$
$A_8 = -0.45874 \times 10^{-7}$
$A_{10} = 0.40598 \times 10^{-9}$

EXAMPLE 5

$f = 39.1 \sim 51.6 \sim 68.0$
$F_{NO} = 4.6 \sim 6.0 \sim 8.0$
$2\omega = 57.8° \sim 45.4° \sim 35.2°$

| | | | |
|---|---|---|---|
| $r_1 =$ 83.5479 | $d_1 =$ 2.000 | $n_{d1} = 1.49216$ | $\nu_{d1} = 57.50$ |
| $r_2 =$ 50.8906 (Aspheric) | $d_2 =$ 6.643 | | |
| $r_3 =$ 60.5568 | $d_3 =$ 1.600 | $n_{d2} = 1.59270$ | $\nu_{d2} = 35.29$ |
| $r_4 =$ 16.6254 | $d_4 =$ 5.783 | $n_{d3} = 1.49782$ | $\nu_{d3} = 66.83$ |
| $r_5 =$ −15.1887 | $d_5 =$ 0.936 | | |
| $r_6 = \infty$ (Stop) | $d_6 =$ (Variable) | | |
| $r_7 =$ −36.3535 (Aspheric) | $d_7 =$ 4.236 | $n_{d4} = 1.49216$ | $\nu_{d4} = 57.50$ |
| $r_8 =$ −22.5844 (Aspheric) | $d_8 =$ 5.557 | | |
| $r_9 =$ −11.0049 | $d_9 =$ 1.886 | $n_{d5} = 1.48749$ | $\nu_{d5} = 70.20$ |
| $r_{10} =$ −193.7938 | | | |

Zooming Spaces

| f | 39.1 | 51.6 | 68.0 |
|---|---|---|---|
| $d_6$ | 13.2916 | 7.5513 | 3.1994 |

Aspherical Coefficients

Second surface
$P = 7.2967$
$A_4 = 0.76367 \times 10^{-4}$
$A_6 = 0.20592 \times 10^{-6}$
$A_8 = 0.27824 \times 10^{-8}$
$A_{10} = 0.48829 \times 10^{-10}$ 7th surface
$P = 1.0000$
$A_4 = 0.93729 \times 10^{-5}$
$A_6 = 0.12606 \times 10^{-6}$
$A_8 = -0.30141 \times 10^{-8}$
$A_{10} = 0$ 8th surface
$P = 1.0044$ -continued $A_4 = -0.43684 \times 10^{-4}$
$A_6 = 0.64361 \times 10^{-6}$
$A_8 = -0.15684 \times 10^{-7}$
$A_{10} = 0.61362 \times 10^{-10}$

EXAMPLE 6

$f = 39.2 \sim 55.3 \sim 78.0$
$F_{NO} = 4.0 \sim 5.7 \sim 8.0$
$2\omega = 57.7° \sim 42.7° \sim 31.0°$

| | | | |
|---|---|---|---|
| $r_1 =$ 32.4820 | $d_1 =$ 2.000 | $n_{d1} = 1.49216$ | $\nu_{d1} = 57.50$ |
| $r_2 =$ 27.3150 (Aspheric) | $d_2 =$ 6.053 | | |
| $r_3 =$ 77.1868 | $d_3 =$ 1.600 | $n_{d2} = 1.64769$ | $\nu_{d2} = 33.80$ |
| $r_4 =$ 21.3660 | $d_4 =$ 7.010 | $n_{d3} = 1.47069$ | $\nu_{d3} = 67.39$ |
| $r_5 =$ −14.2345 | $d_5 =$ 1.000 | | |
| $r_6 = \infty$ (Stop) | $d_6 =$ (Variable) | | |
| $r_7 =$ −43.1827 | $d_7 =$ 3.500 | $n_{d4} = 1.49216$ | $\nu_{d4} = 57.50$ |
| $r_8 =$ −23.4296 (Aspheric) | $d_8 =$ 5.561 | | |
| $r_9 =$ −11.7187 | $d_9 =$ 1.900 | $n_{d5} = 1.48749$ | $\nu_{d5} = 70.20$ |
| $r_{10} =$ −871.4262 | | | |

Zooming Spaces

| f | 39.2 | 55.3 | 78.0 |
|---|---|---|---|
| $d_6$ | 16.9499 | 8.7882 | 3.0002 |

Aspherical Coefficients

Second surface
$P = 7.3085$
$A_4 = 0.40364 \times 10^{-4}$
$A_6 = -0.73843 \times 10^{-7}$
$A_8 = 0.12057 \times 10^{-7}$
$A_{10} = -0.78879 \times 10^{-10}$ 8th surface
$P = 0.9968$
$A_4 = -0.33270 \times 10^{-4}$
$A_6 = -0.99132 \times 10^{-7}$
$A_8 = -0.24353 \times 10^{-8}$
$A_{10} = 0.77832 \times 10^{-12}$

EXAMPLE 7

$f = 39.3 \sim 58.4 \sim 86.9$
$F_{NO} = 3.6 \sim 5.4 \sim 8.0$
$2\omega = 57.6° \sim 40.6° \sim 27.9°$

| | | | |
|---|---|---|---|
| $r_1 =$ 32.5411 | $d_1 =$ 2.000 | $n_{d1} = 1.49216$ | $\nu_{d1} = 57.50$ |
| $r_2 =$ 28.4602 (Aspheric) | $d_2 =$ 6.028 | | |
| $r_3 =$ 32.3365 | $d_3 =$ 1.600 | $n_{d2} = 1.69895$ | $\nu_{d2} = 30.12$ |
| $r_4 =$ 17.8136 | $d_4 =$ 1.723 | | |
| $r_5 =$ 25.8956 | $d_5 =$ 7.277 | $n_{d3} = 1.46450$ | $\nu_{d3} = 65.94$ |
| $r_6 =$ −14.7867 | $d_6 =$ 1.000 | | |
| $r_7 = \infty$ (Stop) | $d_7 =$ (Variable) | | |
| $r_8 =$ −45.0078 (Aspheric) | $d_8 =$ 2.999 | $n_{d4} = 1.49216$ | $\nu_{d4} = 57.50$ |
| $r_9 =$ −28.5755 (Aspheric) | $d_9 =$ 6.343 | | |
| $r_{10} =$ −11.9582 | $d_{10} =$ 1.000 | $n_{d5} = 1.51728$ | $\nu_{d5} = 69.56$ |
| $r_{11} =$ −151.5315 | | | |

Zooming Spaces

| f | 39.3 | 58.4 | 86.9 |
|---|---|---|---|
| $d_7$ | 16.9245 | 8.5875 | 2.9994 |

Aspherical Coefficients

Figure 8:
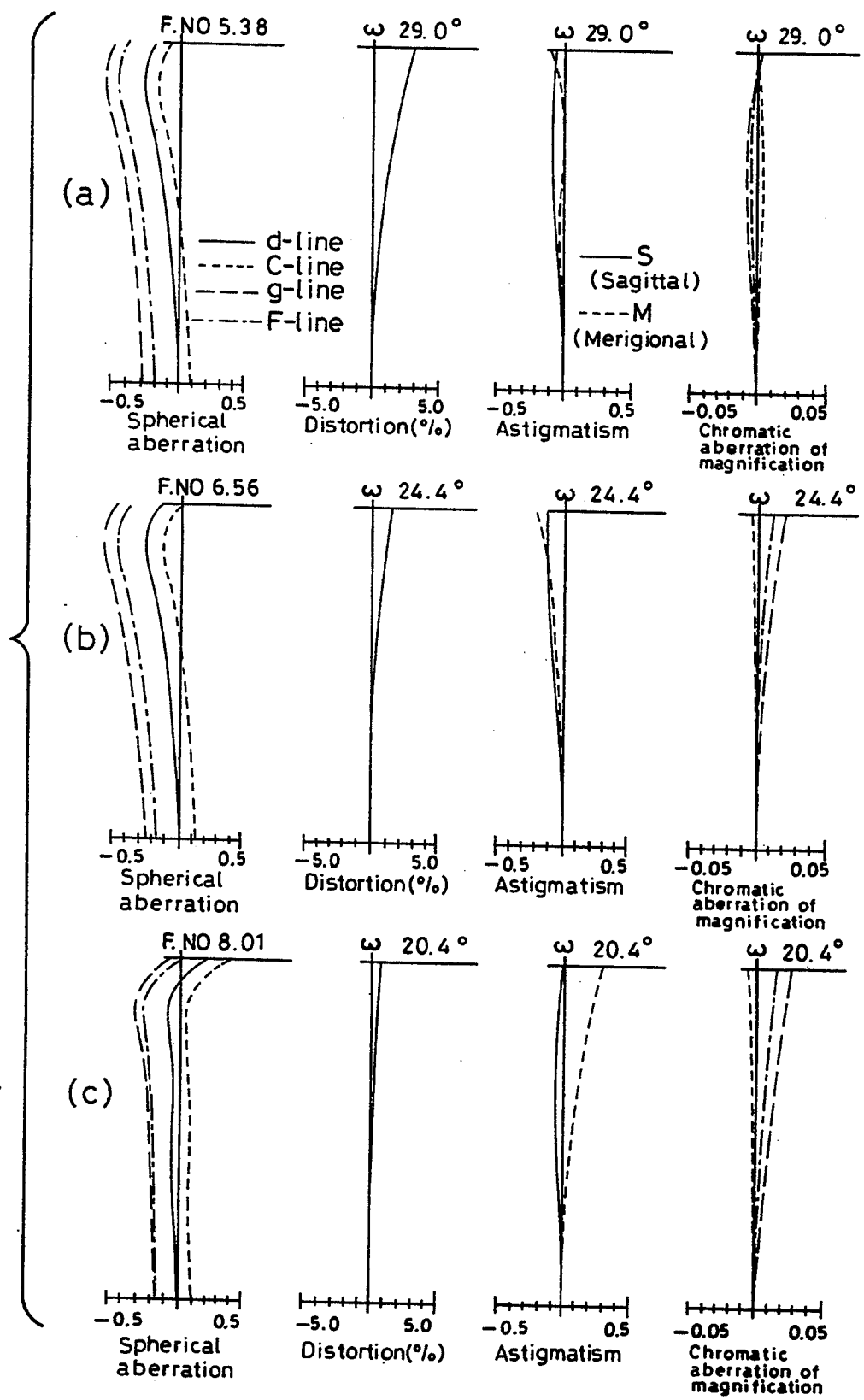
FIG. 8 is aberration diagrams showing the spherical aberration, distortion, astigmatism and chromatic aberration of Example 1 in the (a) wide angle, (b) standard and (c) telephoto conditions.
Figure 9:
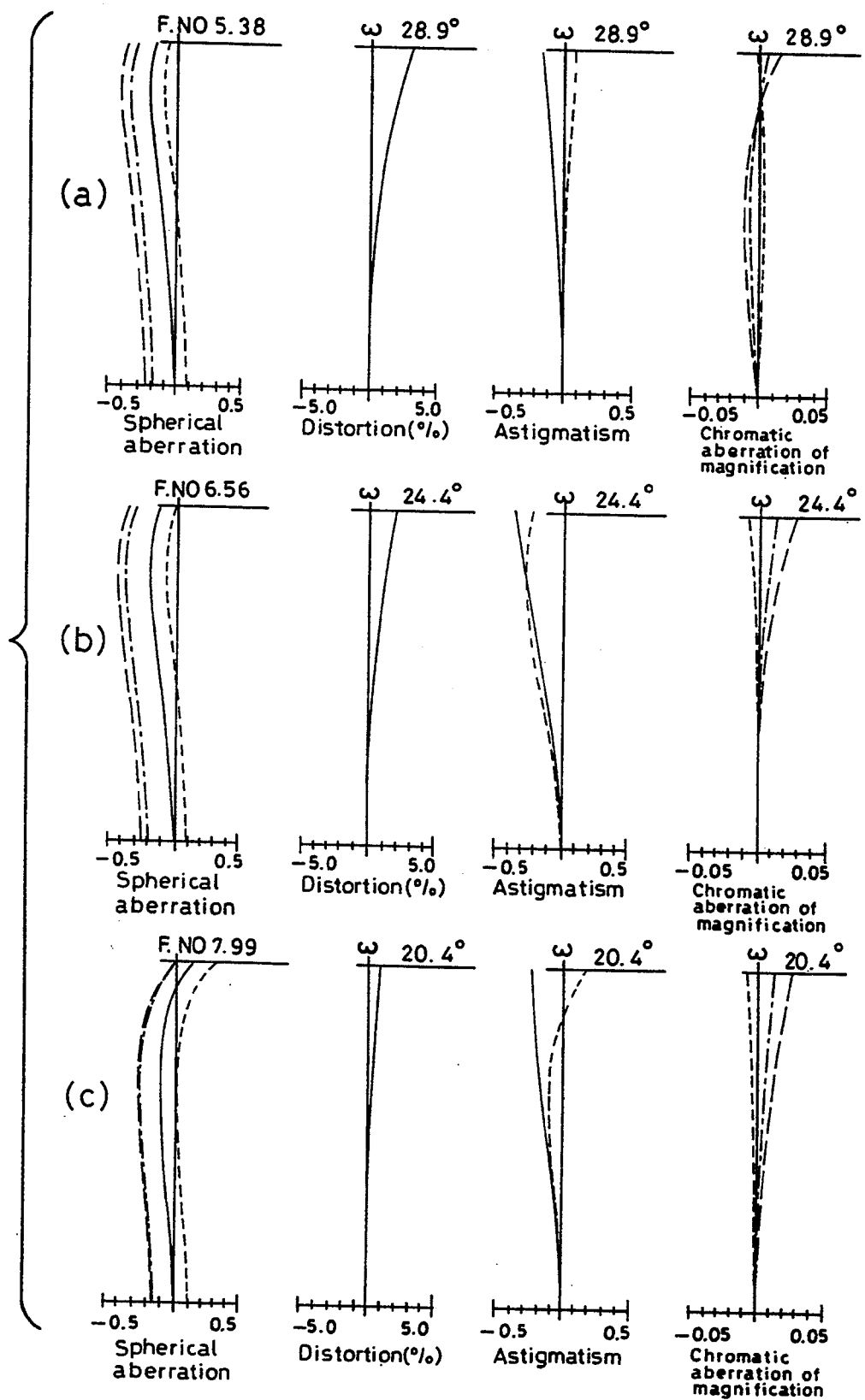
FIG. 9 is aberration diagrams of Example 2 similar those of FIG. 8.
Figure 10:
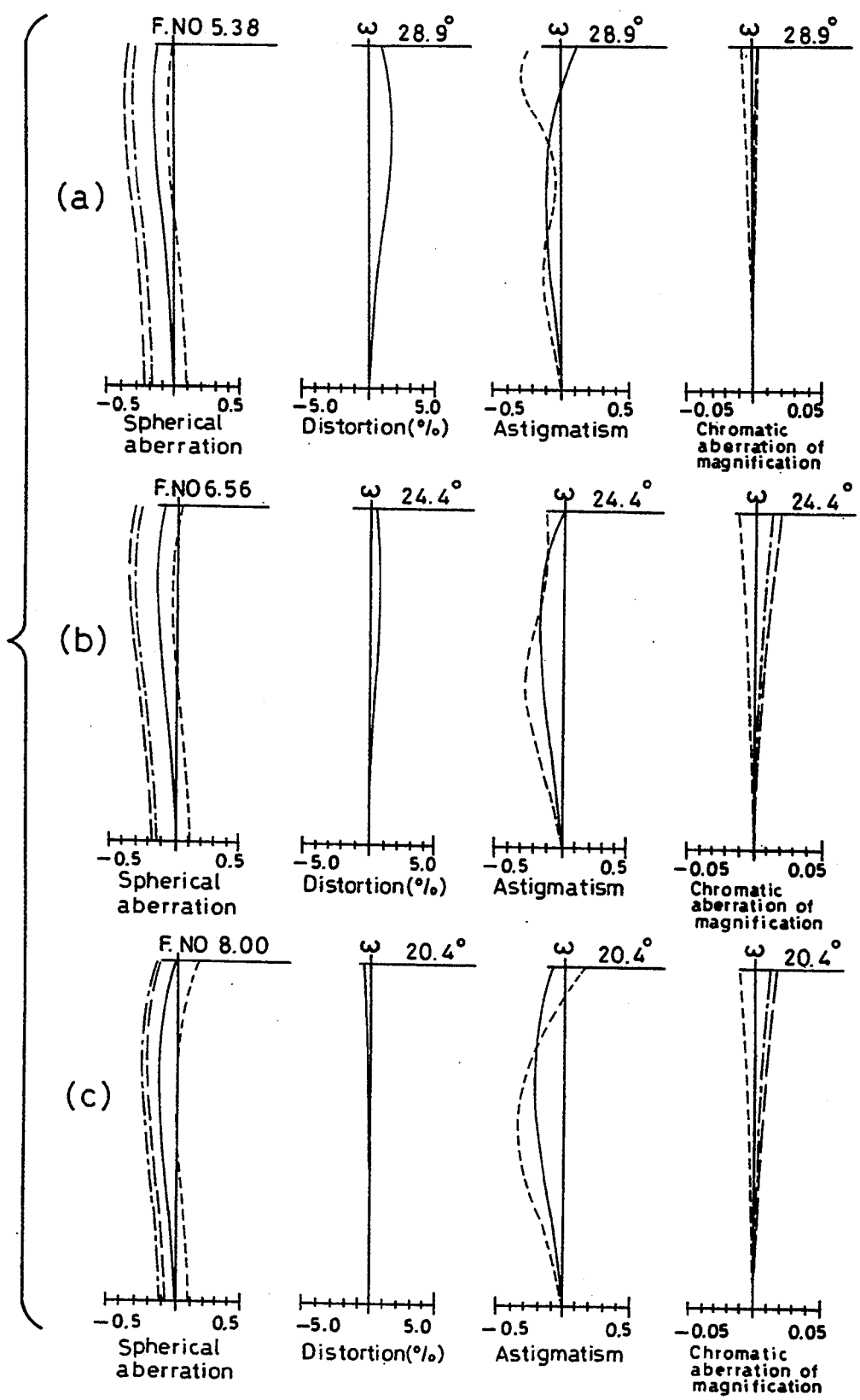
FIG. 10 is aberration diagrams of Example 3 similar to those of FIG. 8.
Figure 11:
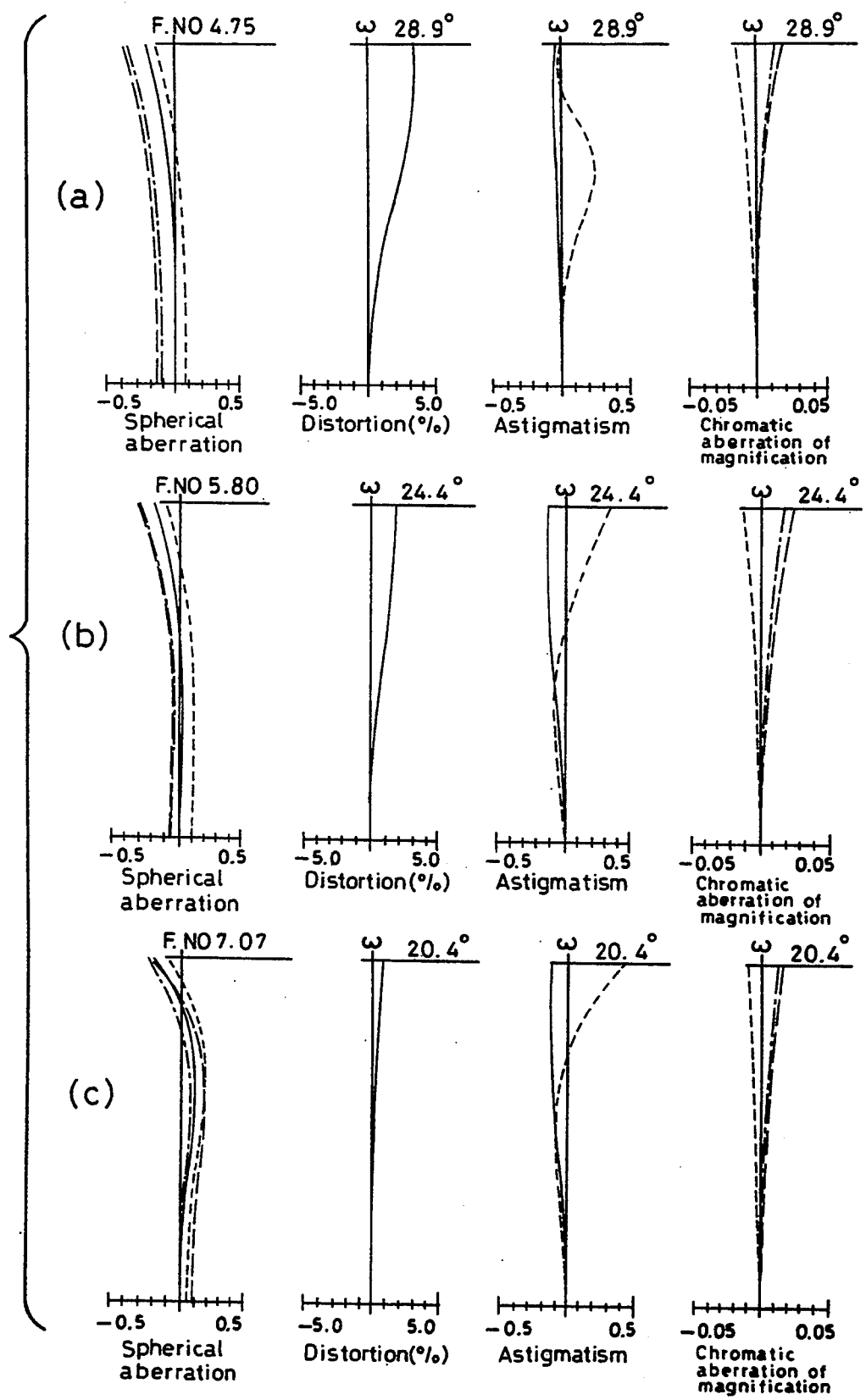
FIG. 11 is aberration diagrams of Example 4 similar those of FIG. 8.
Figure 12:
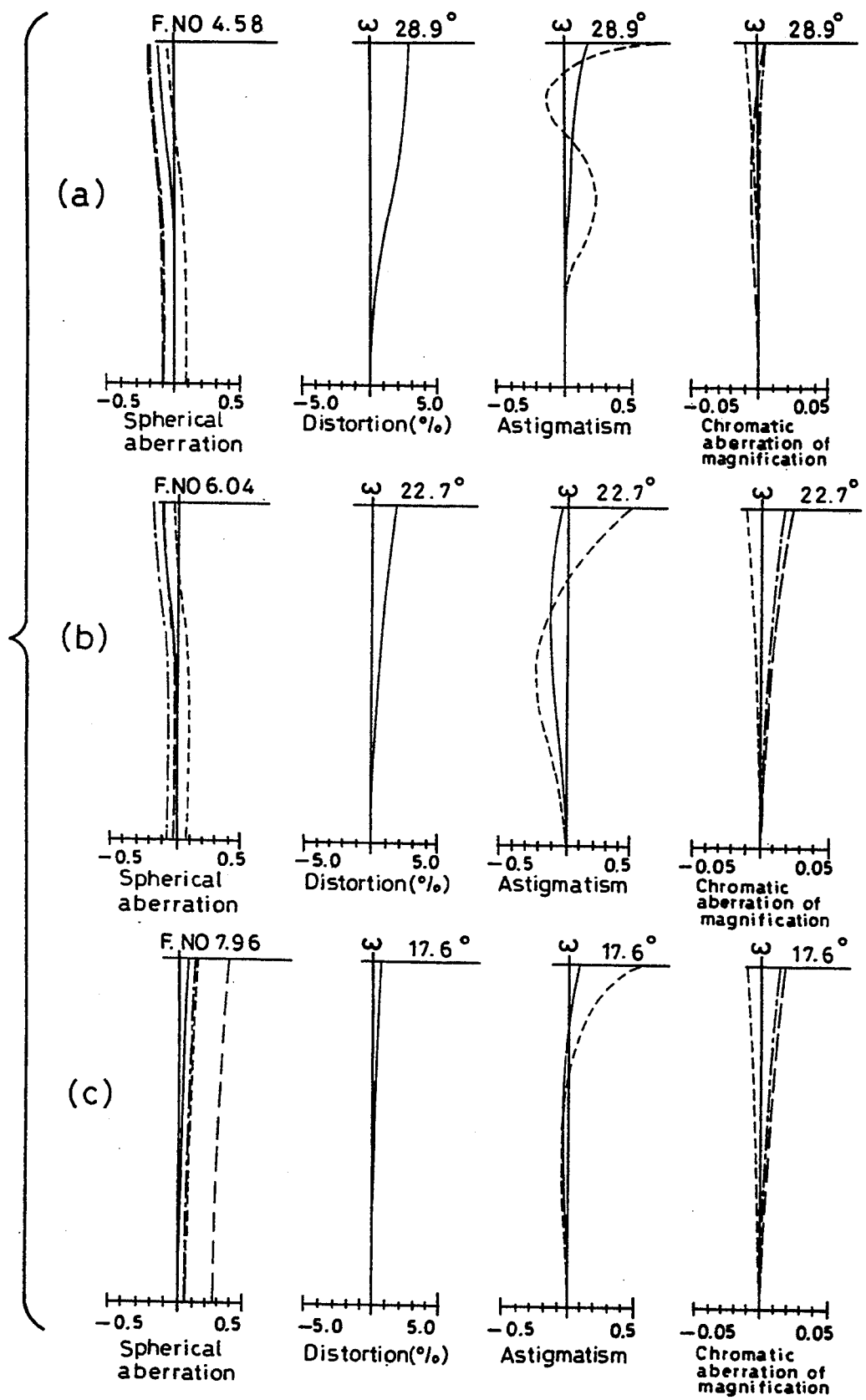
FIG. 12 is aberration diagrams of Example 5 similar to those of FIG. 8.
Figure 13:
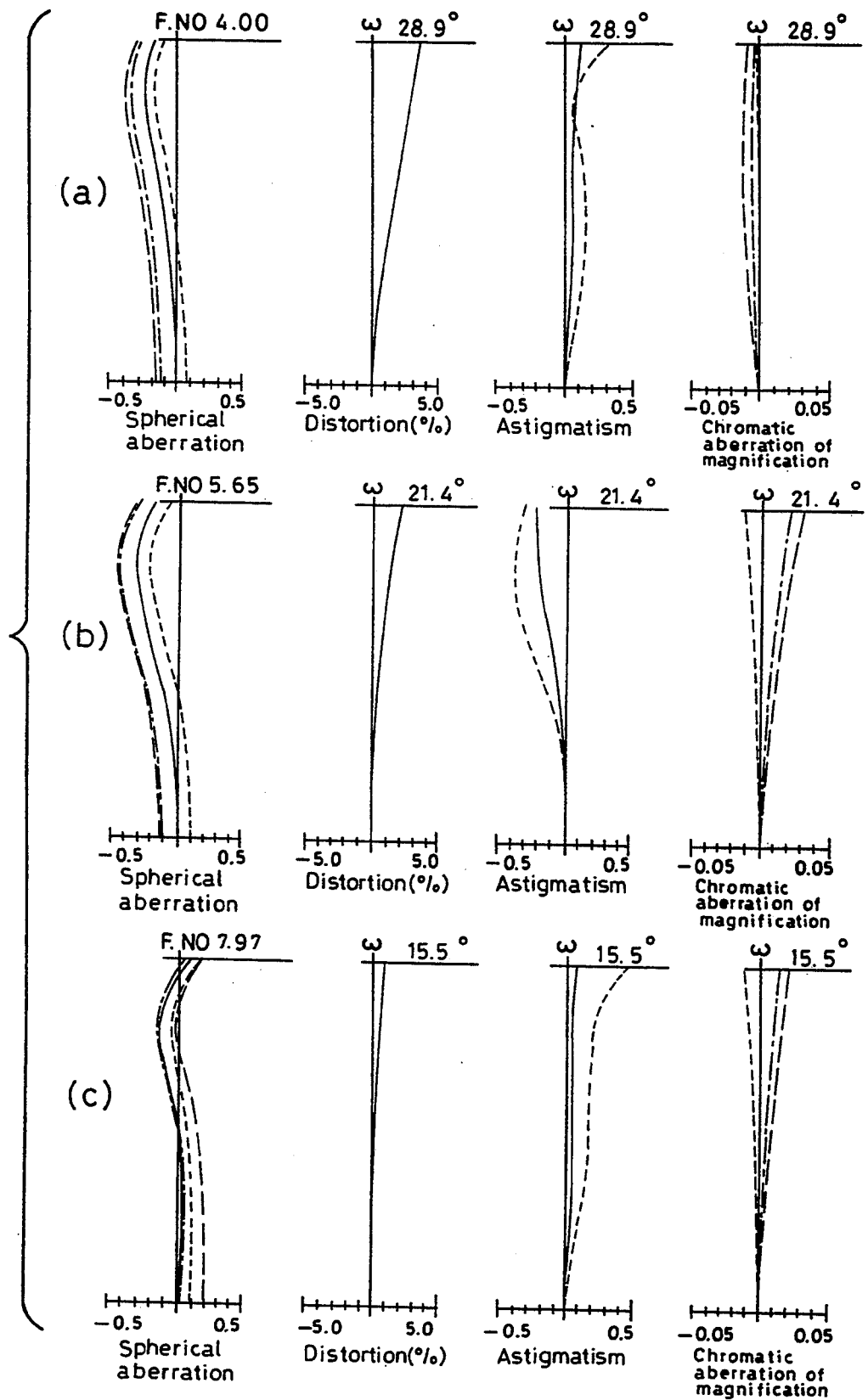
FIG. 13 is aberration diagrams of Example 6 similar those of FIG. 8.
Figure 14:
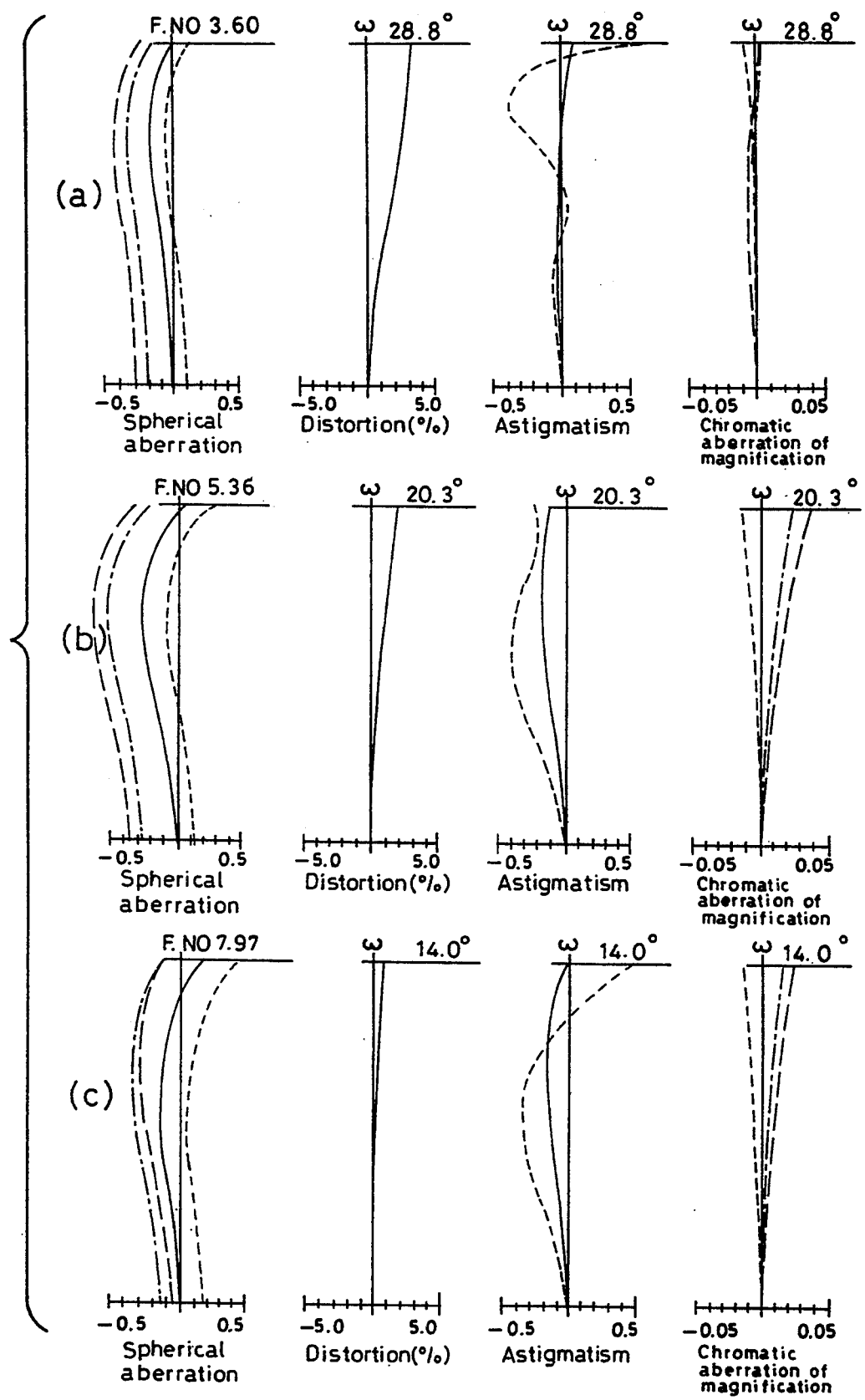
FIG. 14 is aberration diagrams of Example 7 similar to those of FIG. 8.

Second surface
$P = 7.2288$
$A_4 = 0.25309 \times 10^{-4}$
$A_6 = 0.32346 \times 10^{-6}$
$A_8 = -0.22486 \times 10^{-8}$
$A_{10} = 0.29186 \times 10^{-10}$ -continued 8th surface
P = 1.0000
$A_4 = 0.19680 \times 10^{-4}$
$A_6 = 0.39318 \times 10^{-6}$
$A_8 = -0.31302 \times 10^{-8}$
$A_{10} = 0$ 9th surface
P = 0.9970
$A_4 = -0.17618 \times 10^{-4}$
$A_6 = 0.31893 \times 10^{-6}$
$A_8 = -0.54907 \times 10^{-8}$
$A_{10} = 0.12852 \times 10^{-10}$ The spherical aberrations, distortions, astigmatisms and chromatic aberrations of magnification of the zoom lens systems of Example 1-7 at the (a) wide angle, (b) standard and (c) telephoto conditions are shown in the aberration diagrams of FIGS. 8(a), (b) and (c) through FIGS. 14(a), (b) and (c).

The values of the conditions (1) through (7) referred to in Examples 1 through 7 are tabulated below.

|       | Cond.(1),(2) | Cond.(3),(5) | Cond.(4),(6) | Cond. (7) |
|-------|--------------|--------------|--------------|-----------|
| Ex. 1 | 0.94         |              |              |           |
| Ex. 2 | 1.84         |              |              |           |
| Ex. 3 |              | 0.19         | 0.35         | 0.01      |
| Ex. 4 |              | −0.05        | 0.45         | 0.55      |
| Ex. 5 |              | −1.43        | 0.06         | 2.2       |
| Ex. 6 |              | −1.42        | 2            | 3.99      |
| Ex. 7 |              | −1.37        | 1.58         | 3.3       |

As described above, the zoom lens system including a powerless lens according to the invention is an expensive, compact and high-performance zoom lens system, which is less likely to vary in terms of the focal position of the total system due to temperature and humidity changes. This zoom lens system lends itself well fit for use on a lens shutter camera having a zoom ratio of 2 or thereround.

What is claimed is:

1. A zoom lens system including, in order from the object side, a first lens ($L_1$), a second lens ($L_2$) of negative power and a third lens ($L_3$) of positive power and comprising a first lens group (G1) having positive power as a whole and a second lens group (G2) of negative power, said first lens ($L_1$) conforming to the following condition (1):

$$-5 < f_T^2/(f_1 \cdot F) < 5 \quad (1)$$

where $f_T$ is the focal length of the total system at the telephoto end, $f_1$ is the focal length of the first lens ($L_1$), and F is the F-number at the telephoto end.

2. A zoom lens system as claimed in claim 1, wherein said first lens ($L_1$) is a plastic lens.

3. A zoom lens system as claimed in claim 1 or 2, wherein said first lens ($L_1$) has a form in which the surfaces convex and concave on the object and image sides turn in the same direction.

4. A zoom lens system as claimed in claim 1 or 2, wherein said first lens ($L_1$) is a meniscus lens with the convex surface on the object side.

5. A zoom lens system as claimed in claim 1 or 2, wherein said first lens ($L_1$) is a meniscus lens with the convex surface on the object side and having an aspherical surface on at least one surface.

6. A zoom lens system as claimed in claim 3, wherein said second lens group (G2) has at least one plastic lens.

7. A zoom lens system as claimed in claim 4, wherein said second lens group (G2) has at least one plastic lens.

8. A zoom lens system as claimed in claim 5, wherein said second lens group (G2) has at least one plastic lens.

9. A zoom lens system as claimed in claim 3, wherein said second lens group (G2) includes, in order from the object side, a positive meniscus lens ($L_4$) convex on the image side and a negative lens ($L_5$).

10. A zoom lens system as claimed in claim 4, wherein said second lens group (G2) includes, in order from the object side, a positive meniscus lens ($L_4$) convex on the image side and a negative lens ($L_5$).

11. A zoom lens system as claimed in claim 5, wherein said second lens group (G2) includes, in order from the object side, a positive meniscus lens ($L_4$) convex on the image side and a negative lens ($L_5$).

12. A zoom lens system including, in order from the object side, a first lens ($L_1$) with the convex surface on the object side and having an aspherical surface on at least one surface, a second lens ($L_2$) of negative power and a third lens ($L_3$) of positive power and comprising a first lens group (G1) having positive power as a whole and a second lens group (G2) of negative power, said first lens ($L_1$) conforming to the following condition (2):

$$-3 < f_T^2/(f_1 \cdot F) < 3 \quad (2)$$

where $f_T$ is the focal length of the total system at the telephoto end, $f_1$ is the focal length of said first lens ($L_1$), and F is the F-number at the telephoto end.

13. A zoom lens system as claimed in claim 12, wherein said first lens ($L_1$) is a plastic lens.

14. A zoom lens system as claimed in claim 1, 2, 12 or 13, wherein said second lens group (G2) has at least one plastic lens.

15. A zoom lens system as claimed in claim 1, 2, 12 or 13, wherein said second lens group (G2) includes, in order from the object side, a positive meniscus lens ($L_4$) convex on the image side and a negative lens ($L_5$).

16. A zoom lens system including, in order from the object side, a first lens ($L_1$), a second lens ($L_2$) of negative power and a third lens ($L_3$) of positive power and comprising a first lens group (G1) having positive power as a whole and a second lens group (G2) having negative power as a whole, and further conforming to the following conditions (3) and (4):

$$-3.5 < (f_T^2 - f_W^2)/(f_1 \cdot F) < 2.5 \quad (3)$$

$$-4 < f_T^2/(f_1 \cdot F) + f_4(\beta_{2T} - \beta_R)^2/F < 4 \quad (4)$$

where $f_T$ is the focal length of the total system at the telephoto end, $f_W$ is the focal length of the total system at the wide angle end, $f_1$ is the focal length of the first lens ($L_1$), $f_4$ is the focal length of the plastic lens in the second lens group (G2), F is the F-number at the telephoto end, $\beta_{2T}$ is the magnification of the second lens group (G2) at the telephoto end, and $\beta_R$ is the magnification of an optical system located in the rear of said plastic lens.

17. A zoom lens system including, in order from the object side, a first lens (L₁), a second lens (L₂) of negative power and a third lens (L₃) of positive power and comprising a first lens group (G1) having positive power as a whole and a second lens group (G2) having negative power as a whole and further conforming to the following conditions (5) and (6):

$$-2<(f_T{}^2-f_W{}^2)/(f_1\cdot F)<1.5 \qquad (5)$$

$$-2.5<f_T{}^2/(f_1\cdot F)+f_4(\beta_{2T}-\beta_R)^2/F<2.5 \qquad (6)$$

where
- $f_T$ is the focal length of the total system at the telephoto end,
- $f_W$ is the focal length of the total system at the wide angle end,
- $f_1$ is the focal length of the first lens (L₁),
- $f_4$ is the focal length of the plastic lens in the second lens group (G2),
- F is the F-number at the telephoto end,
- $\beta_{2T}$ is the magnification of the second lens group (G2) at the telephoto end, and
- $\beta_R$ is the magnification of an optical system located in the rear of said plastic lens.

18. A zoom lens system as claimed in claim 16 or 17, wherein said first lens (L 1) is a plastic lens and said second lens group (G2) is provided with a plastic lens (L4 on the side proximate to the object side.

19. A zoom lens system as claimed in claim 16 or 17, wherein said plastic lens (L₄) is provided with a negative lens (L₅) on the image side.

20. A zoom lens system as claimed in claim 16 or 17, wherein said second lens group (G2) consists of, in order from the object side, a positive meniscus lens (L₄) convex on the object side and a negative lens (L₅).

21. A zoom lens system as claimed in claim 16 or 17, which further conforms to the following condition (7):

$$f_4(\beta_{2T}-\beta_R)^2/F<3.5 \qquad (7).$$

22. A zoom lens system as claimed in claim 18, which further conforms to the following condition (7):

$$f_4(\beta_{2T}-\beta_R)^2/F<3.5 \qquad (7).$$

23. A zoom lens system as claimed in claim 19, which further conforms to the following condition (7):

$$f_4(\beta_{2T}-\beta_R)^2/F<3.5 \qquad (7).$$

24. A zoom lens system as claimed in claim 20, which further conforms to the following condition (7):

$$f_4(\beta_{2T}-\beta_R)^2/F<3.5 \qquad (7).$$

25. A zoom lens system as claimed in claim 1, 2, 12, 13, or 17, wherein said second and third lenses (L₂ and L₃) are cemented together.

26. A zoom lens system as claimed in claim 1, 2, 12, 16 or 17, wherein said first lens groups (G1 and G2) move toward the object sides from the wide angle to telephoto ends for zooming.

27. A zoom lens system as claimed in claim 1, 2, 12, 16 or 17, wherein the spacing between the first and second lens groups ( G1 and G2 ) narrows.

28. A zoom lens system comprising, in order from the object side:

a first lens unit (G1) having positive power as a whole and including a lens (L₁) satisfying the following condition ①; and a second lens unit (G2) having negative power as a whole;

wherein zooming from a wide end toward a tele end is effected by varying the spacing between said first lens unit (G1) and said second lens unit (G2):

$$-5<f_T{}^2/(f_1\cdot F)<5 \qquad ①$$

where
- $f_T$ is the focal length of the entire system at the tele end;
- $f_1$ is the focal length of the lens (L₁) in said first lens unit (G1) that is closest to the object side; and
- F is the F-number at the tele end.

29. A zoom lens system comprising, in order from the object side:

a first lens unit (G1) having positive power as a whole and including a lens (L₁) disposed at a position closest to the object side, said lens (L₁) satisfying the following condition ②; and a second lens unit (G2) having negative power as a whole;

wherein zooming from a wide end toward a tele end is effected by varying the spacing between said first lens unit (G1) and said second lens unit (G2):

$$-3<f_T{}^2/(f_1\cdot F)<3 \qquad ②$$

where
- $f_T$ is the focal length of the entire system at the tele end;
- $f_1$ is the focal length of the lens (L₁) in said first lens unit (G1) that is closest to the object side; and
- F is the F-number at the tele end.

30. A zoom leans system comprising, in order from the object side:

a first lens unit (G1) having positive power as a whole and including a lens (L₁) satisfying the following condition ①, and a doublet (L₂, L₃) in which lens surfaces that face each other form a convex configuration in the same direction; and a second lens unit (G2) having negative power as whole;

wherein zooming from a wide end toward a tele end is effected by varying the spacing between said first lens unit (G1) and said second lens unit (G2):

$$-5<f_T{}^2/(f_1\cdot F)<5 \qquad ①$$

where
- $f_T$ is the focal length of the entire system at the tele end;
- $f_1$ is the focal length of the lens (L₁) in said first lens unit (G1) that is closest to the object side; and
- F is the F-number at the tele end.

31. A zoom lens system comprising, in order from the object side:

a first lens unit (G1) having positive power as a whole and including a lens (L₁) satisfying the following condition ②, and a doublet (L₂, L₃) in which lens surfaces that face each other form a convex configuration in the same direction; and a second lens unit (G2) having negative power as a whole;

wherein zooming from a wide end toward a tele end is effected by varying the spacing between said first lens unit (G1) and said second lens unit (G2):

$$-3 < f_T^2/(f_1 \cdot F) < 3 \qquad (2)$$

where $f_T$ is the focal length of the entire system at the tele end;

$f_1$ is the focal length of the lens ($L_1$) in said first lens unit (G1) that is closest to the object side; and F is the F-number at the tele end.

32. A zoom lens system as claimed in claims 30 or 31, wherein said doublet ($L_2$, $L_3$) is a cemented lens.

33. A zoom lens system as claimed in claims 30 or 31, wherein said doublet ($L_2$, $L_3$) consists of two lens elements provided to face each other across an air spacing.

34. A zoom lens system comprising, in order from the object side:

a first lens unit (G1) having positive power as a whole and including a first lens component having one lens and satisfying the following condition (1) as a whole, and a doublet in which lens surfaces that face each other form a convex configuration in the same direction; and a second lens unit (G2) having a plurality of lenses and negative power as a whole;

wherein said second lens unit (G2) comprises at least one positive lens and at least one negative lens; and zooming is effected by varying the spacing between said first lens unit (G1) and said second lens unit (G2):

$$-5 < f_T^2/(f_1 \cdot F) < 5 \qquad (1)$$

where $f_T$ is the focal length of the entire system at the tele end;

$f_1$ is the focal length of the lens of the first lens unit (G1) that is closest to the object side; and F is the F-number at the tele end.

35. A zooming lens system as claimed in claim 34, wherein said second lens unit (G2) consists of two lenses of one positive lens and one negative lens.

36. A zoom lens system as claimed in claim 34, wherein said first lens component consists of one lens.

37. A zoom lens system comprising, in order from the object side;

a first lens unit (G1) having positive power as a whole and including a first lens component having one lens and satisfying the following condition (1) as a whole, and a doublet in which lens surfaces that face each other form a convex configuration in the same direction;

a diaphragm; and a second lens unit (G2) having negative power as a whole;

wherein zooming is effected by varying the spacing between said first lens unit (G1) and said second lens unit (G2):

$$-5 < f_T^2/(f_1 \cdot F) < 5 \qquad (1)$$

where f is the focal length of the entire system at the tele end;

$f_1$ is the focal length of the lens of the first lens unit (G1) that is closest to the object side; and F is the F-number at the tele end.

38. A zoom lens system as claimed in claim 34, 35 or 37, wherein said doublet consists of two lens elements provided to face each other across an air spacing.

39. A zoom lens system as claimed in claim 34, 35 or 37, wherein said doublet is a cemented lens.

40. A zoom lens system as claimed in claim 37, wherein said second lens unit (G2) comprises one negative lens.

* * * * *